(12) United States Patent
Reddy et al.

(10) Patent No.: US 7,662,755 B2
(45) Date of Patent: *Feb. 16, 2010

(54) SEALANT COMPOSITIONS AND METHODS OF USING THE SAME TO ISOLATE A SUBTERRANEAN ZONE FROM A DISPOSAL WELL

(75) Inventors: B. Raghava Reddy, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 473 days.

This patent is subject to a terminal disclaimer.

(21) Appl. No.: 11/035,299

(22) Filed: Jan. 13, 2005

(65) Prior Publication Data

US 2005/0124501 A1    Jun. 9, 2005

Related U.S. Application Data

(62) Division of application No. 10/436,655, filed on May 13, 2003, now Pat. No. 6,951,250.

(51) Int. Cl.
C09K 8/44 (2006.01)
E21B 33/14 (2006.01)

(52) U.S. Cl. .................. 507/220; 507/234; 507/266; 507/267; 523/130

(58) Field of Classification Search .............. 507/203, 507/219, 220, 233, 234, 266, 267, 268; 523/130
See application file for complete search history.

(56) References Cited

U.S. PATENT DOCUMENTS

| | | | |
|---|---|---|---|
| 2,805,719 A | 9/1957 | Anderson | |
| 3,548,944 A | 12/1970 | Hess et al. | 166/295 |
| 3,709,298 A * | 1/1973 | Pramann | 166/276 |
| 3,757,862 A * | 9/1973 | Kern et al. | 166/280.1 |
| 3,759,327 A * | 9/1973 | Carnes | 166/295 |
| 3,776,311 A * | 12/1973 | Carnes et al. | 166/295 |
| 3,793,244 A | 2/1974 | Megee et al. | |
| 3,835,926 A | 9/1974 | Clement | |
| 3,928,052 A | 12/1975 | Clement, Jr. | |
| 3,960,801 A | 6/1976 | Cole et al. | 260/33.6 EP |
| 3,967,681 A | 7/1976 | Curzon | |
| 3,976,135 A * | 8/1976 | Anderson | 166/276 |
| 4,015,995 A | 4/1977 | Hess | 106/287 S |
| 4,034,811 A | 7/1977 | Sparlin et al. | 166/295 |
| 4,042,032 A * | 8/1977 | Anderson et al. | 166/276 |
| 4,043,921 A | 8/1977 | Hessert et al. | |
| 4,072,194 A | 2/1978 | Cole et al. | 166/295 |
| 4,371,648 A * | 2/1983 | Gardikes et al. | 523/144 |
| 4,393,939 A | 7/1983 | Smith et al. | |
| 4,480,693 A | 11/1984 | Newlove et al. | |
| 4,489,785 A | 12/1984 | Cole | 166/295 |
| 4,512,407 A * | 4/1985 | Friedman | 166/295 |
| 4,515,635 A | 5/1985 | Rao et al. | |
| 4,537,918 A | 8/1985 | Parcevaux et al. | |
| 4,555,269 A | 11/1985 | Rao et al. | |
| 4,557,763 A | 12/1985 | George et al. | |
| 4,582,139 A | 4/1986 | Childs et al. | |
| 4,629,747 A | 12/1986 | Wu et al. | |
| 4,643,255 A | 2/1987 | Sandiford et al. | |
| 4,683,949 A | 8/1987 | Sydansk et al. | |
| 4,706,755 A | 11/1987 | Roark et al. | |
| 4,721,160 A | 1/1988 | Parcevaux et al. | |
| 4,749,592 A | 6/1988 | Gasper et al. | |
| 4,761,183 A | 8/1988 | Clarke | |
| 4,767,460 A | 8/1988 | Parcevaux et al. | |
| 4,861,822 A | 8/1989 | Keskey et al. | |
| 5,086,850 A | 2/1992 | Harris et al. | |
| 5,121,795 A | 6/1992 | Ewert et al. | |
| 5,123,487 A | 6/1992 | Harris et al. | |
| 5,125,455 A | 6/1992 | Harris et al. | |

(Continued)

FOREIGN PATENT DOCUMENTS

| | | |
|---|---|---|
| DE | 26 52 045 | 5/1978 |
| DE | 2652045 A * | 5/1978 |
| EP | 0145151 A1 | 6/1985 |
| EP | 0566118 A1 | 10/1993 |
| EP | 1201874 A2 | 5/2002 |
| EP | 1369401 A2 | 12/2003 |
| GB | 2296713 A | 7/1996 |
| WO | 9902464 A1 | 1/1999 |
| WO | 2005078235 A1 | 8/2005 |
| WO | 2005100739 A1 | 10/2005 |

OTHER PUBLICATIONS

Office action from a related counterpart application dated Feb. 25, 2005.
Foreign communication from a related counterpart application dated Aug. 30, 2004.
Office action from a related counterpart application dated Sep. 7, 2004.

(Continued)

*Primary Examiner*—Timothy J. Kugel
(74) *Attorney, Agent, or Firm*—Craig W. Roddy; Conley Rose, P.C.

(57) ABSTRACT

Sealant compositions and methods of using the same to isolate a subterranean zone are provided. The compositions include partially polymerized furfuryl alcohol/aldehyde, a coupling agent, a diluent, a curing agent, a ductility imparting agent, and a filler for increasing the compressive strengths of the sealant compositions. Methods of isolating a subterranean zone include pumping the foregoing sealant composition into a well bore down through a conduit and up through an annulus disposed between the conduit and the walls of the well bore. The sealant composition exhibits a sufficiently long cure time such that it does not harden until it reaches the annulus. Thus, the sealant composition effectively attaches the conduit to the walls of the well bore. The sealant composition is substantially resistant to degradation by waste chemicals disposed of in the well bore.

20 Claims, No Drawings

U.S. PATENT DOCUMENTS

| | | | |
|---|---|---|---|
| 5,127,473 A | 7/1992 | Harris et al. | |
| 5,134,118 A | 7/1992 | Patel et al. | |
| 5,146,986 A | 9/1992 | Dalrymple | |
| 5,159,980 A | 11/1992 | Onan et al. | |
| 5,181,568 A | 1/1993 | McKown et al. | |
| 5,238,064 A | 8/1993 | Dahl et al. | |
| 5,284,512 A | 2/1994 | Koskan et al. | |
| 5,293,938 A | 3/1994 | Onan et al. | |
| 5,296,627 A | 3/1994 | Tang et al. | |
| 5,325,922 A | 7/1994 | Cowan et al. | |
| 5,332,037 A | 7/1994 | Schmidt et al. | |
| 5,335,726 A | 8/1994 | Rodrigues | |
| 5,338,726 A | 8/1994 | Shiosaki et al. | |
| 5,340,860 A | 8/1994 | Brake et al. | |
| 5,358,051 A | 10/1994 | Rodrigues | |
| 5,377,757 A | 1/1995 | Ng | |
| 5,411,093 A | 5/1995 | Jennings, Jr. | |
| 5,443,123 A * | 8/1995 | Wall et al. | 166/288 |
| 5,563,201 A | 10/1996 | Joanicot et al. | |
| 5,587,034 A * | 12/1996 | Ma | 156/166 |
| 5,588,488 A | 12/1996 | Vijn et al. | |
| 5,663,123 A | 9/1997 | Goodhue, Jr. et al. | |
| 5,688,844 A | 11/1997 | Chatterji et al. | |
| 5,709,821 A | 1/1998 | von Bonin et al. | |
| 5,712,314 A * | 1/1998 | Surles et al. | 166/295 |
| 5,779,787 A | 7/1998 | Brothers et al. | |
| 5,836,392 A | 11/1998 | Urlwin-Smith | |
| 5,845,845 A | 12/1998 | Merke et al. | 239/1 |
| 5,850,880 A | 12/1998 | Moran et al. | |
| 5,900,451 A | 5/1999 | Krishnan et al. | |
| 5,913,364 A | 6/1999 | Sweatman | |
| 5,945,387 A | 8/1999 | Chatterji et al. | |
| 5,948,344 A | 9/1999 | Cusick et al. | |
| 6,016,871 A | 1/2000 | Burts, Jr. | |
| 6,060,434 A | 5/2000 | Sweatman et al. | |
| 6,130,287 A | 10/2000 | Krishnan | |
| 6,167,967 B1 | 1/2001 | Sweatman | |
| 6,176,315 B1 | 1/2001 | Reddy et al. | |
| 6,177,484 B1 | 1/2001 | Surles | 523/131 |
| 6,182,758 B1 | 2/2001 | Vijn | |
| 6,187,839 B1 * | 2/2001 | Eoff et al. | 523/130 |
| 6,192,986 B1 | 2/2001 | Urlwin-Smith | |
| 6,196,317 B1 | 3/2001 | Hardy | |
| 6,209,643 B1 | 4/2001 | Nguyen et al. | 166/276 |
| 6,210,476 B1 | 4/2001 | Chatterji et al. | 106/677 |
| 6,216,783 B1 | 4/2001 | Hocking et al. | |
| 6,218,343 B1 | 4/2001 | Burts, Jr. | |
| 6,257,335 B1 | 7/2001 | Nguyen et al. | 166/280 |
| 6,258,757 B1 | 7/2001 | Sweatman et al. | |
| 6,302,207 B1 | 10/2001 | Nguyen et al. | 166/276 |
| 6,310,008 B1 | 10/2001 | Rietjens | |
| 6,312,515 B1 | 11/2001 | Barlet-Gouedard et al. | |
| 6,321,841 B1 * | 11/2001 | Eoff et al. | 166/291 |
| 6,367,549 B1 | 4/2002 | Chatterji et al. | 166/292 |
| 6,419,016 B1 | 7/2002 | Reddy | |
| 6,457,524 B1 | 10/2002 | Roddy | |
| 6,497,283 B1 | 12/2002 | Eoff et al. | |
| 6,508,306 B1 | 1/2003 | Reddy et al. | |
| 6,516,883 B1 | 2/2003 | Chatterji et al. | 166/293 |
| 6,590,050 B1 | 7/2003 | Bair et al. | |
| 6,607,035 B1 | 8/2003 | Reddy et al. | |
| 6,626,992 B2 | 9/2003 | Vijn et al. | |
| 6,656,266 B1 | 12/2003 | Barlet-Gouedard et al. | |
| 6,664,215 B1 | 12/2003 | Tomlinson | |
| 6,667,279 B1 | 12/2003 | Hessert et al. | |
| 6,702,021 B1 | 3/2004 | Nguyen et al. | 166/295 |
| 6,702,044 B2 | 3/2004 | Reddy et al. | |
| 6,722,433 B2 | 4/2004 | Brothers et al. | |
| 6,743,288 B2 | 6/2004 | Eoff et al. | |
| 6,764,981 B1 | 7/2004 | Eoff et al. | |
| 6,766,858 B2 | 7/2004 | Nguyen et al. | |
| 6,770,604 B2 | 8/2004 | Reddy et al. | |
| 6,776,236 B1 * | 8/2004 | Nguyen | 166/279 |
| 6,822,061 B2 | 11/2004 | Eoff et al. | |
| 6,823,939 B2 | 11/2004 | Bouwmeester et al. | |
| 6,823,940 B2 | 11/2004 | Reddy et al. | |
| 6,837,316 B2 | 1/2005 | Reddy et al. | |
| 6,838,417 B2 | 1/2005 | Bouwmeester et al. | |
| 6,843,841 B2 | 1/2005 | Reddy et al. | |
| 6,875,729 B2 | 4/2005 | Verlaan et al. | |
| 6,936,574 B2 | 8/2005 | Dao et al. | |
| 6,939,833 B2 | 9/2005 | Burts, III | |
| 6,951,250 B2 | 10/2005 | Reddy et al. | |
| 6,997,261 B2 | 2/2006 | Burts, III | |
| 7,007,752 B2 | 3/2006 | Reddy et al. | |
| 7,091,160 B2 | 8/2006 | Dao et al. | |
| 7,114,570 B2 * | 10/2006 | Nguyen et al. | 166/295 |
| 7,128,148 B2 | 10/2006 | Eoff et al. | |
| 7,131,493 B2 | 11/2006 | Eoff et al. | |
| 7,143,828 B2 | 12/2006 | Reddy et al. | |
| 7,267,174 B2 | 9/2007 | Gonsveld et al. | |
| 2005/0197257 A1 | 9/2005 | Bouwmeester | |
| 2005/0230112 A1 | 10/2005 | Reddy et al. | |
| 2006/0086503 A1 | 4/2006 | Reddy et al. | |
| 2006/0122071 A1 | 6/2006 | Reddy et al. | |
| 2006/0167133 A1 | 7/2006 | Gromsveld et al. | |
| 2006/0234871 A1 | 10/2006 | Dalrymple et al. | |

OTHER PUBLICATIONS

Advisory Action dated Jan. 11, 2008 (6 pages), U.S. Appl. No. 11/041,554, filed Jan. 24, 2005.

Advisory Action dated Jan. 17, 2008 (3 pages), U.S. Appl. No. 11/041,554, filed Jan. 24, 2005.

American Petroleum Institute Production Department, "Specification for materials and testing for well cements," API Specification 10, Fifth Edition, Jul. 1, 1990, pp. 3-101 plus cover page and three additional pages, American Petroleum Institute.

Ewert, D. P., et al., "Small-particle-size cement," SPE Production Engineering, May 1991, pp. 213-216, 241-242, Society of Petroleum Engineers.

Foreign communication from a related counterpart application—International Search Report and Written Opinion, PCT/GB2006/000001, May 29, 2006, 8 pages.

Foreign communication from a related counterpart application—International Search Report, PCT/GB2007/000135, May 2, 2007, 3 pages.

Foreign communication from a related counterpart application—International Preliminary Report on Patentability, PCT/GB2006/000001, Jul. 24, 2007, 7 pages.

Halliburton brochure entitled "Halad®-344 fluid-loss additive," 1998, 2 pages, Halliburton Energy Services, Inc.

Halliburton brochure entitled "Latex 2000 cement additive," 1998, 2 pages, Halliburton Energy Services, Inc.

Halliburton brochure entitled "MICROSAND cement additive," 1999, 2 pages, Halliburton Energy Services, Inc.

Halliburton brochure entitled "The PermSeal(TM) system," 2002, 2 pages, Halliburton.

Halliburton brochure entitled "SSA-1 strength-stabilizing agent," 1998, 2 pages, Halliburton Energy Services, Inc.

Halliburton brochure entitled "SSA-2 coarse silica flour," 1999, 2 pages, Halliburton Energy Services, Inc.

Notice of Allowance dated Jun. 8, 2005 (4 pages), U.S. Appl. No. 10/436,655, filed May 13, 2003.

Notice of Allowance dated Jun. 20, 2007 (6 pages), U.S. Appl. No. 11/041,577, filed Jan. 24, 2005.

Office Action dated Jan. 10, 2007 (17 pages), U.S. Appl. No. 11/041,577, filed Jan. 24, 2005.

Office Action dated Jun. 28, 2007 (22 pages), U.S. Appl. No. 11/041,554, filed Jan. 24, 2005.

Office Action (Final) dated Oct. 25, 2007 (12 pages), U.S. Appl. No. 11/041,554, filed Jan. 24, 2005.

Office Action dated Mar. 5, 2008 (10 pages), U.S. Appl. No. 11/041,554, filed Jan. 24, 2005.

Supplemental Notice of Allowability dated Jul. 16, 2007 (3 pages), U.S. Appl. No. 11/041,577, filed Jan. 24, 2005.

Office Action (Final) dated Aug. 13, 2008 (21 pages), U.S. Appl. No. 11/041,554, filed Jan. 24, 2005.

Office Action (Final) dated Dec. 18, 2008 (21 pages), U.S. Appl. No. 11/041,554, filed Jan. 24, 2005.

Office Action dated Mar. 3, 2009 (23 pages), U.S. Appl. No. 11/041,554, filed Jan. 24, 2005.

Office Action dated Apr. 3, 2009 (35 pages), U.S. Appl. No. 11/335,134, filed Jan. 19, 2006.

Office Action (Final) dated Jul. 13, 2009 (29 pages), U.S. Appl. No. 11/041,554 filed, Jan. 24, 2005.

Advisory Action dated Aug. 24, 2009 (4 pages), U.S. Appl. No. 11/041,554, filed Jan. 24, 2005.

Office Action (Final) dated Oct. 26, 2009 (17 pages), U.S. Appl. No. 11/335,134, filed Jan. 19, 2006.

\* cited by examiner

SEALANT COMPOSITIONS AND METHODS OF USING THE SAME TO ISOLATE A SUBTERRANEAN ZONE FROM A DISPOSAL WELL

CROSS-REFERENCE TO RELATED APPLICATIONS

This is a Divisional Application of U.S. patent application Ser. No. 10/436,655, now U.S. Pat. No. 6,951,250 filed May 13, 2003 and entitled "Sealant Compositions And Methods Of using The Same To Isolate A Subterranean Zone From A Disposal Well," which is hereby incorporated by reference herein in its entirety.

FIELD OF THE INVENTION

This invention generally relates to sealant compositions and methods of using the same. More specifically, the invention relates to methods of isolating a subterranean zone by pumping a sealant composition comprising partially polymerized furfuryl alcohol/aldehyde into a disposal well.

BACKGROUND OF THE INVENTION

Waste chemicals generated by, for example, industrial plants, are often disposed of by injecting the chemicals into disposal wells that penetrate subterranean zones (also called formations). Suitable subterranean zones for receiving such waste chemicals are separated by natural barriers from other subterranean zones containing useful resources such as oil, gas, and water. Wells that penetrate subterranean zones have traditionally been formed by drilling a well bore down to the subterranean zone, followed by placing a string of metal pipe, e.g., casing, in the well bore. A hydraulic cement slurry is pumped downwardly through the interior of the pipe and upwardly through the annulus, which is located between the exterior of the pipe and the walls of the well bore. The cement slurry in the annulus is permitted to set, i.e., harden into a solid mass, thereby attaching the string of pipe to the walls of the well bore and sealing the annulus.

Unfortunately, many waste chemicals injected into disposal wells, such as organic materials, acidic materials, caustic materials, and salt water, are corrosive to the hydraulic cement in the well bore. Moreover, hydrogen sulfide and carbon dioxide gases generated by the subterranean zone or injected into the disposal well can lead to degradation of the hydraulic cement. In particular, hydrogen sulfide corrodes the cement, and carbon dioxide reacts with calcium in the cement when exposed to temperatures exceeding 200° F., which are often encountered in the well bore, thus forming calcium carbonate. The high downhole temperatures in the well bore can accelerate this degradation of the hydraulic cement. As a result of the degradation of the hydraulic cement in the annulus, the waste chemicals injected into the disposal well can undesirably leak into subterranean zones containing useful fluids such as water that could otherwise be used as drinking water.

In order to overcome the foregoing problem, epoxy-based compositions having the ability to resist degradation by chemicals have been developed to replace hydraulic cements used in disposal wells. While the epoxy-based compositions are highly resistant to degradation, they suffer from the limitation that their curing times are relatively short at temperatures of 300° F. or higher. Such temperatures are commonly encountered down in the disposal well. The curing times of the epoxy-based compositions are therefore too short for the compositions to be properly placed in the annulus such that they can isolate laterally adjacent subterranean zones from waste chemicals injected into the disposal well. In particular, as an epoxy-based composition is being pumped down the pipe in the disposal well, at least a portion of it hardens, never reaching the annulus. In addition, any epoxy-based composition that becomes cured in the annulus, such that it attaches the string of pipe to the walls of the well bore, can soften again under the relatively high downhole temperatures. As a result, the epoxy-based composition may fail to hold the string of pipe in place.

A need therefore exists for a chemically resistant sealant composition having a curing time long enough to allow it to be properly placed in the annulus. Further, it would be desirable if the sealant composition would remain in the hardened state despite being exposed to relatively high temperatures.

SUMMARY OF THE INVENTION

According to one embodiment, sealant compositions for isolating a subterranean zone include partially polymerized furfuryl alcohol, furfuryl aldehyde, or combinations thereof (individually and collectively referred to herein as partially polymerized furfuryl alcohol/aldehyde) and a coupling agent for bonding the sealant compositions to the subterranean zone. In addition, the sealant compositions include a diluent such as butyl acetate, furfuryl acetate, or 2-butoxy-ethanol. The sealant compositions also include a curing agent for causing the partially polymerized furfuryl alcohol/aldehyde to cure, a ductility imparting agent, and a filler for increasing the compressive strengths of the sealant compositions. The partially polymerized furfuryl alcohol/aldehyde exhibits a cure time of from about 6 to about 96 hours when passed into a well bore. It is also substantially resistant to degradation by chemicals such as corrosive chemicals.

According to another embodiment, methods of isolating subterranean zones include forming a sealant composition comprising partially polymerized furfuryl alcohol/aldehyde and pumping the sealant composition into a well bore positioned adjacent to the subterranean zone. More specifically, the sealant composition is pumped down through a conduit, e.g., a pipe, previously placed in the well bore and up through an annulus disposed between the conduit and the walls of the well bore. Because the partially polymerized furfuryl alcohol/aldehyde exhibits a cure time of from about 6 to about 96 hours in the well bore, it does not harden until it reaches the annulus. Thus, the sealant composition effectively attaches the conduit to the walls of the well bore. Waste chemicals can be disposed of in another subterranean zone penetrated by the well bore by injecting them into the well bore. The sealant composition is substantially resistant to degradation by the waste chemicals and thus isolates the waste chemicals from the subterranean zone positioned adjacent to the sealant composition.

DETAILED DESCRIPTION OF THE PREFERRED EMBODIMENTS

In preferred embodiments, sealant compositions for isolating a subterranean zone comprise partially polymerized furfuryl alcohol/aldehyde, a curing agent for causing the sealant compositions to cure, a coupling agent for bonding the sealant compositions to the subterranean zone, and a diluent. The sealant compositions may also comprise a ductility imparting agent and a filler material for increasing the strengths of the compositions. The amount of partially polymerized furfuryl alcohol/aldehyde in a sealant composition preferably ranges from about 30% to about 90% by weight of the sealant composition, more preferably from about 40 to about 80% by weight of the sealant composition, and most preferably from about 50% to about 70% by weight of the sealant composition. The partially polymerized furfuryl alcohol/aldehyde comprises polymerized furfuryl alcohol/aldehyde (i.e., furan-formaldehyde polymer) and non-polymerized (i.e., unreacted) furfuryl alcohol/aldehyde. The weight ratio of polymerized furfuryl alcohol/aldehyde to non-polymerized or unreacted furfuryl alcohol/aldehyde in the sealant compositions preferably ranges from about 1 to 1 to about 10 to 1. Using partially polymerized furfuryl alcohol/aldehyde as opposed to completely polymerized furfuryl alcohol/aldehyde in the sealant compositions ensures that the composition remains sufficiently viscous to be pumped into a well bore.

The partially polymerized furfuryl alcohol/aldehyde can be cured at temperatures above about 200° F., i.e., typical temperatures in a well bore. The cure time of the partially polymerized furfuryl alcohol/aldehyde at such temperatures is in the range of from about 6 to about 96 hours, allowing it to be pumped to the annulus of a well bore without being concerned that it will harden before it actually reaches the annulus. In addition, the partially polymerized furfuryl alcohol/aldehyde forms a thermoset resin and thus cannot be re-softened despite being exposed to relatively high temperatures such as those experienced in a well bore. The polymerized furfuryl alcohol/aldehyde is substantially resistant to degradation by chemicals, making the sealant composition particularly suitable for isolating a subterranean zone from waste chemicals injected into a disposal well.

As mentioned above, the sealant compositions comprise a curing agent, also known as a catalyst. A curing agent is herein defined as a material having the ability to cause the partially polymerized furfuryl alcohol/aldehyde to cure after a latent period to a hard, impermeable solid. As used herein, curing refers to polymerizing the non-polymerized furfuryl alcohol/aldehyde in the partially polymerized furfuryl alcohol/aldehyde, as well as further polymerization of previously polymerized furfuryl alcohol/aldehyde, thereby forming a crosslinked network of polymer chains. Curing agents suitable for curing the partially polymerized furfuryl alcohol/aldehyde at temperatures above about 200° F. include, but are not limited to, organic and inorganic acid anhydrides, ammonium salts, sodium bisulfate, hydrolyzable esters such as butyl acetate, furfuryl acetate, organic acids such as maleic acid, fumaric acid, inorganic acids such as phosphoric or sulfonic acid, and combinations thereof. Of these, organic acids are preferred and sodium bisulfate is more preferred. The amount of curing agent in a sealant composition preferably ranges from about 0.01% to about 10% by weight of the sealant composition, more preferably from about 1% to about 3% by weight of the sealant concentration.

The sealant compositions also comprise a coupling agent, which is defined as a material having the ability to bond (i.e., adhere) the sealant compositions to solid surfaces, such as the surfaces of a metal pipe and of a subterranean well bore, when the sealant compositions are in a static state (e.g., when the sealant compositions are being cured). Examples of suitable coupling agents include, but are not limited to, silanes having functional groups that give the silanes the ability to bond with solid surfaces. Examples of such silanes are acrylate functionalized silanes, amine functionalized silanes, and vinyl functionalized silanes. Specific examples of silane coupling agents that can be utilized in the sealant compositions include, but are not limited to, N-2-(aminoethyl)-3-aminopropyltrimethoxysilane, 3-glycidoxypropyltrimethoxysilane, and N-beta-(aminoethyl)-gamma-aminopropyl trimethoxysilane. Of these, N-beta-(aminoethyl)-gamma-aminopropyl trimethoxysilane is preferred. The amount of silane coupling agent included in a sealant composition is preferably in the range of from about 0.1% to about 3% by weight of the sealant composition, more preferably about 1% by weight of the sealant composition.

A liquid diluent may also be present in the sealant compositions to increase the flexibility thereof. Due to the presence of the diluent in the sealant compositions, the amount of partially polymerized furfuryl alcohol/aldehyde contained in the sealant compositions is relatively reduced. The less expensive diluent thus reduces the overall cost of the sealant compositions. The diluent preferably decreases the viscosity of the sealant compositions, ensuring that the compositions can be pumped into a well bore. Further, the diluent preferably reduces the brittleness of the sealant compositions, meaning that it reduces the tendency of the compositions to crack or flake when bent, flexed, or scratched. The diluent also preferably acts as a heat sink for the exothermic reaction that occurs as the non-polymerized furfuryl alcohol/aldehyde in the sealant compositions is cured. Examples of suitable diluents for use in the sealant compositions include, but are not limited to, alky acetates such as butyl acetate and furfuryl acetate, 2-butoxy ethanol, and combinations thereof. Of these, butyl acetate is preferred and furfuryl acetate is more preferred. The amount of diluent in a sealant composition preferably ranges from about 1% to about 60% by weight of the sealant composition, more preferably from about 15% to about 40% by weight of the sealant concentration.

Preferably, the sealant compositions comprise a filler, which is herein defined as a particulate material having the ability to increase the compressive strengths of the sealant compositions, wherein compressive strength refers to the ability of a material to withstand compressive (i.e., squeezing) loads without being crushed. Such fillers also provide for the ability to adjust the densities of the compositions. Examples of suitable fillers include, but are not limited to, sand-based materials, low-density microspheres, and combinations thereof. A microsphere is herein defined as a particle ranging from about 1 to hundreds of micrometers (i.e., microns) in size, wherein the particle may be solid or hollow and is preferably a substantially hollow object filled with gas that is spherical or substantially spherical in shape. Examples of various microspheres that are commercially available from 3M Company are SCOTCHLITE glass bubbles (hollow spheres) having crush strengths of about 2,000 to 10,000 psi, Z-LIGHT SPHERES ceramic microspheres having crush strengths of about 2,000 to 60,000 psi, ZEEOSPHERES ceramic microspheres having crush strengths of about 2,000 to 60,000 psi, and cenospheres, i.e., hollow spheres primarily comprising silica ($SiO_2$) and alumina ($Al_2O_3$) that are a naturally occurring by-product of the burning process of a coal-fired power plant. The amount of filler present in a sealant composition preferably ranges from about 1% to about 50% by weight of the sealant composition, preferably from about 5% to about 30% by weight of the sealant composition.

The sealant compositions also preferably comprise a ductility imparting agent. A ductility imparting agent is herein defined as a material having the ability to increase the ductility of the cured sealant composition, wherein ductility refers to the ability of a material to stretch under the application of tensile load and retain the deformed shape on the removal of the load. The presence of the ductility imparting agent in the sealant compositions preferably makes the compositions sufficiently flexible to stay bonded to a conduit, particularly a metal pipe, in a well bore despite the expansions and contractions thereof. Otherwise, a small gap could develop between the pipe and the sealant compositions, allowing fluids injected into the well to undesirably flow through the gap and back to the surface. Such expansion and contractions of the metal pipe can occur several times during the lifetime of a well due to pressure and temperature cycles in the well that may be caused by, for example, the disposal of waste chemicals having different densities and temperatures in the well. Examples of suitable ductility imparting agents include, but are not limited to, phthalate materials, i.e., organic liquids that cause the partially polymerized furfuryl/aldehyde alcohol to crosslink less tightly than normal. Examples of phthalate materials include alkyl phthalates such as diethyl phthalate, butyl benzyl phthalate, and di-(2-ethylhexyl) phthalate. Of these, diethyl phthalate is preferred. The amount of ductility imparting agent present in a sealant composition preferably ranges from about 0.01% to about 10% by weight of the sealant composition, preferably from about 1% to about 5% by weight of the sealant composition.

As deemed appropriate by one skilled in the art, additional additives may be introduced to the sealant compositions for improving or changing their properties, such as controlling density of sealant composition, obtaining desirable mechanical strengths, or preventing shrinkage or expansion. Examples of such additives include, but are not limited to, thermoplastic polymer beads or flakes, including polyolefins, polystyrene, divinylbenzene, polyfluoro carbons, polyether ether ketones and polyamide imides. The compositions may also contain mechanical property modifying additives such as fibers. Examples of fibers include carbon fibers, polypropylene fibers, mineral fibers, polyamide fibers, and the like. Of these, mineral fibers are preferred.

In preferred embodiment, methods of making a sealant composition include partially polymerizing furfuryl alcohol/aldehyde. Both polymer and water are generated in the acid catalyzed polymerization reaction of furfuryl alcohol/aldehyde, as indicated by the following formula:

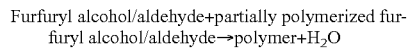
Furfuryl alcohol/aldehyde+partially polymerized furfuryl alcohol/aldehyde→polymer+H$_2$O The exact extent of polymerization that any given quantity of furfuryl alcohol/aldehyde undergoes is very difficult to control and measure. However, the use of gel permeation chromatography, percent of resin solids, viscosity, and hydroxyl numbers together have been found to be reliable mechanisms for determining or estimating the degree of polymerization which is acceptable for producing the sealant composition.

Preparing the sealant composition further includes blending the diluent, the filler, and the ductility imparting agent with the partially polymerized furfuryl alcohol/aldehyde, followed by adding the coupling agent and the curing agent in any order or simultaneously to the sealant composition while mixing. Adding the coupling agent and the curing agent to the mixture last ensures that if there is ever a situation in which the pumping operation has to be suspended in mid-operation, the mixture does not harden and become immobile. The curing agent may be added to the rest of the mixed sealant composition through a static mixer or through the suction side of a pump used to pump the uncatalyzed slurry, allowing the mixed volume of the sealant composition to be preserved in its current state by simply turning off the valve through which the curing agent passes.

According to preferred embodiments, methods of isolating a first subterranean zone comprise drilling a well bore down to a second subterranean zone while circulating a drilling fluid through the well bore. The first subterranean zone is located adjacent to the second subterranean zone and thus must be isolated from waste chemicals that later may be disposed of in the well bore. A conduit, e.g., a string of pipe such as casing, is then run in the well bore. The previously described sealant composition is pumped down through the conduit and up through the annulus of the well bore. The curing agent is present in the sealant composition in an amount suitable to provide for curing of the composition at temperatures above about 200° F. in the well bore. The cure time of the sealant composition is in the range of from about 6 to about 96 hours. As such, the sealant composition does not prematurely cure before it has had time to reach the annulus. The sealant composition is thus allowed to cure in the annulus, forming a hardened sealant composition that attaches the conduit to the walls of the well bore and that substantially isolates the first subterranean zone from the well bore. The sealant composition is substantially resistant to degradation by waste chemicals such as acids. Therefore, waste chemicals may be subsequently passed into the well bore for disposal in the second subterranean zone without being concerned that the chemicals could leak into the first subterranean zone. That is, the sealant composition forms a barrier between the waste chemicals and the first subterranean zone. Thus, materials produced by the first subterranean zone, such as oil, water, and gas, are protected by the sealant composition from contamination.

EXAMPLES

The invention having been generally described, the following examples are given as particular embodiments of the invention and to demonstrate the practices and advantages hereof. It is understood that the examples are given by way of illustration and are not intended to limit the specification or the claims to follow in any manner.

Example 1

Several samples of the sealant compositions in accordance with the present invention were prepared by first providing 60% partially polymerized furfuryl alcohol (hereinafter referred to as furan systems) by weight of the sealant composition. The 60% partially polymerized furfuryl alcohol was comprised of 40% polymerized furfuryl alcohol and 20% non-polymerized furfuryl alcohol, each by weight of the sealant composition and each purchased from Durez Corp. of New York. The furan systems were then blended with different amounts of a butyl acetate diluent or a furfuryl acetate diluent as shown in Table 1. The resulting mixtures were then blended with different amounts of A-1120 silane coupling agent commercially available from OSi Specialties, Crompton Corp., New York, sodium bisulfate, acting as a source of curing agent or delayed acid catalyst, , water for dissolving the acid catalyst, 70/170-mesh silica (US Series) sand filler, and lightweight sand filler. The samples were then cured at a temperature of 325° F. for various cure times. After curing, the compressive strengths of the samples were measured. The amounts of the components in each sealant composition sample, the curing times of the samples, and the compressive strengths of the samples are shown below in Table 1.

TABLE 1

| Composition | Sample 1 | Sample 2 | Sample 3 | Sample 4 | Sample 5 | Sample 6 | Sample 7 | Sample 8 |
|---|---|---|---|---|---|---|---|---|
| Furan System, mL | 20 | 20 | 20 | 20 | 22 | 22 | 22 | 22 |
| Butyl Acetate (BA) or Furfuryl Acetate (FA), mL | 5 (BA) | 5 (BA) | 5 (FA) | 5 (FA) | 10 (BA) | 10 (FA) | 10 (BA) | 10 (FA) |
| A-1120 silane coupling agent, mL | 0.2 | 0.2 | 0.2 | 0.2 | 0.3 | 0.3 | 0.3 | 0.3 |
| Sodium Bisulfate, grams | 1 | 3 | 1 | 3 | 3 | 3 | 3 | 3 |
| Water, mL | 1 | 3 | 1 | 3 | 3 | 3 | 3 | 3 |
| 70/170-mesh sand, grams | 1 | 3 | 1 | 3 | 3 | 3 | 3 | 3 |
| Lightweight sand, grams | 1 | 3 | 1 | 3 | 3 | 3 | 3 | 3 |
| Cure time @ 325° F., hours | 96 | 96 | 96 | 96 | 72 | 72 | 72 | 72 |
| Compressive Strength, psi | 3,609 | 3,504 | 5,915 | 6,218 | 672 | 3,984 | 1,365 | 7,579 |

As evident in Table 1, the compressive strengths of the majority of the samples are relatively high in that they are greater than about 3500 psi. As such, the samples comprising partially polymerized furfuryl alcohol are suitable for use in sealing subterranean zones.

Example 2

Differential scanning calorimetry was performed at 325° F. on one of the furan sealant compositions described above to monitor the % of furan sealant composition that was cured over a period of time. For comparison, a conventional epoxy-based sealant composition was also subjected to differential scanning calorimetry at 325° F. The results from this example are shown below in Table 2

TABLE 2

| Time (hours) | Epoxy Sealant Composition, (% cured of the composition) | Furan Sealant Composition (% cured of the composition) |
|---|---|---|
| 0 | 0 | 0 |
| 2 | 83.4 | 41.5 |
| 4 | 88.6 | 55.6 |
| 6 | 90.9 | 63.2 |
| 8 | 92.2 | 68.1 |
| 10 | 93.1 | 71.5 |
| 12 | 93.8 | 74.1 |

As indicated in Table 2, the furan sealant composition was cured at a much slower rate than the epoxy-based composition.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claims.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A sealant composition comprising a partially polymerized furfuryl compound selected from the group consisting of furfuryl alcohol, furfuryl aldehyde, and combinations thereof, wherein a weight ratio of the polymerized furfuryl compound to non-polymerized furfuryl compound in the sealant composition ranges from about 1:1 to about 10:1, wherein the furfuryl compound in the sealant composition ranges from about 30% to about 90% by weight of the sealant composition, and further comprising a coupling agent for bonding the sealant composition to a wall of a well bore positioned adjacent to the subterranean zone, to a conduit disposed in the well bore, or both, wherein the coupling agent comprises 3-glycidoxypropyltrimethoxysilane, and further comprising a curing agent.

2. The sealant composition of claim 1, further comprising a diluent in an amount of from about 1% to about 60% by weight of the sealant composition.

3. The sealant composition of claim 2, wherein the diluent comprises at least one of alkyl acetates such as butyl acetate and furfuryl acetate, and 2-butoxy-ethanol.

4. The sealant composition of claim 1, further comprising a filler for increasing a compressive strength of the sealant composition in an amount of from about 1% to about 50% by weight of the sealant composition.

5. The sealant composition of claim 4, wherein the filler comprises at least one of sand and microspheres.

6. The sealant composition of claim 1, wherein an amount of the furfuryl compound in the sealant composition ranges from about 40% to about 80% by weight of the sealant composition.

7. The sealant composition of claim 1, wherein an amount of the furfuryl compound in the sealant composition ranges from about 50% to about 70% by weight of the sealant composition.

8. The sealant composition of claim 1, wherein the partially polymerized furfuryl compound exhibits a cure time of from about 6 to about 96 hours when passed into the well bore.

9. The sealant composition of claim 1, wherein an amount of the curing agent in the sealant composition ranges from about 0.01% to about 10% by weight of the sealant composition.

10. The sealant composition of claim 1, wherein an amount of the coupling agent in the sealant composition ranges from about 0.1% to about 3% by weight of the sealant composition.

11. The sealant composition of claim 1, wherein the curing agent comprises at least one of organic and inorganic acid anhydrides, ammonium salts, sodium bisulfate, hydrolyzable esters, furfuryl acetate, organic acids, fumaric acid, and inorganic acids.

12. The sealant composition of claim 1, wherein the weight ratio of the polymerized furfuryl compound to non-polymerized furfuryl compound in the sealant composition ranges from 1.2:1 to about 10:1.

13. The sealant composition of claim 1, wherein the weight ratio of the polymerized furfuryl compound to non-polymerized furfuryl compound in the sealant composition ranges from 2:1 to about 10:1.

14. A sealant composition comprising a partially polymerized furfuryl compound selected from the group consisting of furfuryl alcohol, furfuryl aldehyde, and combinations thereof, wherein a weight ratio of the polymerized furfuryl compound to non-polymerized furfuryl compound in the sealant composition ranges from about 1:1 to about 10:1, wherein the furfuryl compound in the sealant composition ranges from about 30% to about 90% by weight of the sealant composition, and further comprising a coupling agent for bonding the sealant composition to a wall of a well bore positioned adjacent to the subterranean zone, to a conduit disposed in the well bore, or both, wherein the coupling agent comprises 3-glycidoxypropyltrimethoxysilane, and further comprising a curing agent and further comprising a ductility imparting agent for increasing the ductility of the sealant composition.

15. The sealant composition of claim 14, wherein an amount of the ductility imparting agent in the sealant composition ranges from about 0.01% to about 10% by weight of the sealant composition.

16. The sealant composition of claim 14, wherein the ductility imparting agent comprises a phthalate material such as diethyl phthalate, butyl benzyl phthalate, and di-(2-ethylhexyl) phthalate.

17. A sealant composition comprising a partially polymerized furfuryl compound selected from the group consisting of furfuryl alcohol, furfuryl aldehyde, and combinations thereof, wherein a weight ratio of the polymerized furfuryl compound to non-polymerized furfuryl compound in the sealant composition ranges from about 2:1 to about 10:1, and wherein the furfuryl compound in the sealant composition ranges from about 30% to about 90% by weight of the sealant composition, further comprising a ductility imparting agent for increasing the ductility of the sealant composition, wherein an amount of the ductility imparting agent in the sealant composition ranges from about 0.01% to about 10% by weight of the sealant composition, further comprising a curing agent wherein the curing agent is selected from the group consisting of organic and inorganic acid anhydrides, ammonium salts, and sodium bisulfate and further comprising a coupling agent wherein the coupling agent comprises 3-glycidoxypropyltrimethoxysilane.

18. A sealant composition comprising a partially polymerized furfuryl compound selected from the group consisting of furfuryl alcohol, furfuryl aldehyde, and combinations thereof, wherein a weight ratio of the polymerized furfuryl compound to non-polymerized furfuryl compound in the sealant composition ranges from about 2:1 to about 10:1, wherein the furfuryl compound in the sealant composition ranges from about 30% to about 90% by weight of the sealant composition, and further comprising a curing agent, wherein an amount of the curing agent in the sealant composition ranges from about 0.01% to about 10% by weight of the sealant composition and wherein the curing agent is selected from the group consisting of organic and inorganic acid anhydrides, ammonium salts, and sodium bisulfate and further comprising a mechanical property modifying additive.

19. The sealant composition of claim 18, wherein the mechanical property modifying additive comprises a fiber.

20. A sealant composition comprising a partially polymerized furfuryl compound selected from the group consisting of furfuryl alcohol, furfuryl aldehyde, and combinations thereof, wherein a weight ratio of the polymerized furfuryl compound to non-polymerized furfuryl compound in the sealant composition ranges from about 1:1 to about 10:1, wherein the furfuryl compound in the sealant composition ranges from about 30% to about 90% by weight of the sealant composition, and further comprising a coupling agent for bonding the sealant composition to a wall of a well bore positioned adjacent to the subterranean zone, to a conduit disposed in the well bore, or both, wherein the coupling agent comprises 3-glycidoxypropyltrimethoxysilane, and further comprising a curing agent and further comprising thermoplastic polymer beads or flakes.

* * * * *